United States Patent [19]

Kasuya et al.

[11] 4,447,800

[45] May 8, 1984

[54] OBSTACLE DETECTOR FOR USE IN VEHICLES

[75] Inventors: Hideo Kasuya; Hiroshi Endo, both of Yokosuka, Japan

[73] Assignee: Nissan Motor Company, Limited, Kanagawa, Japan

[21] Appl. No.: 286,184

[22] Filed: Jul. 22, 1981

[30] Foreign Application Priority Data

Jul. 25, 1980 [JP] Japan .......................... 55-105201[U]

[51] Int. Cl.³ ............................................. G08C 1/00
[52] U.S. Cl. .................................... 340/904; 340/901
[58] Field of Search ................. 343/7 VM; 340/31 R, 340/32, 33, 34, 38 P, 39; 356/5

[56] References Cited

U.S. PATENT DOCUMENTS 3,442,347  5/1969  Hodgson et al. .............. 340/32 UX
3,749,197  7/1973  Deutsch ........................ 343/7 VM
4,290,043  9/1981  Kaplan .................................. 340/34

FOREIGN PATENT DOCUMENTS 1569890  6/1880  United Kingdom .

OTHER PUBLICATIONS

"FUJITSU" vol. 27, published in 1976 by FUJITSU LIMITED, Japan pp.. 131 and 132.

Primary Examiner—James J. Groody
Attorney, Agent, or Firm—Lowe, King, Price & Becker

[57] ABSTRACT

An obstacle detector mounted on an automotive vehicle includes a light emitting element, which includes a semiconductor infrared laser, which transmits a light signal through an optical transmission system against any obstacle liable to present on the road on which the vehicle runs. The light signal has a wavelength which is 6.5 microns and which is of such a wavelength that solar light energy having the same wavelength as that of the light signal is not present, or is of very low intensity, at the surface of the earth and that the light energy from light sources such as the headlights of vehicles and/or streetlamps having substantially the same wavelength as that of the light signal, when the light energy has passed through the front glass of the headlights or streetlamps is not present or is of very low intensity. An optical receiving system receives part of the light reflected by the obstacle and passes it to an optical filter which has a pass band width whose central wavelength is 6.5 microns. The output of the filter is converted by a photodetector to a corresponding electrical signal for processing by a data processor in order to determine the distance from the vehicle to the obstacle, the azimuth of the obstacle, the velocity of the vehicle relative to the obstacle, etc.

11 Claims, 3 Drawing Figures

OBSTACLE DETECTOR FOR USE IN VEHICLES

BACKGROUND OF THE INVENTION

The present invention relates to an obstacle detector for use in an automotive vehicle which detects any obstacle, or any other vehicle whether moving or parked, present on the road on which the vehicle with the detector runs by transmitting a light signal against the obstacle or other vehicle and receiving the reflected light from the obstacle or other vehicle.

It is necessary to provide automotive vehicles with obstacle detectors at the front or rear, or both, of the vehicles to detect any obstacle, or any other vehicle whether moving or parked, likely to be present on the road on which the vehicle with the detector travels so as to avoid collision with the obstacle or the other vehicle by generating a warning signal to the driver or by stopping the vehicle automatically in an emergency.

If a light beam is used for detecting purposes, it may be adversely affected by solar energy in the daytime, or by the light from the headlights of other vehicles or streetlamps at night so that erroneous detection may occur.

It has been shown in the internal magazine "FUJITSU" Vol. 27, No. 6, 1976 published by FUJITSU LIMITED in Japan that due to the humidity contained in the atmosphere, the transmission of light through the atmosphere is very low in the range of 6.5±1 microns.

The transmittance of light through the front glass of vehicle headlights or streetlamps is very low for light having wavelengths in excess of approximately 5 microns. The transmittance of light through other general types of glass is also very low except for the following ranges: 0.28 to 4.5 microns for Borosilicate (Pyrex) glass; 0.21 to 5.0 microns for shrunk (or Vycor) glass; 0.12 to 4.5 microns for Silica ($SiO_2$) glass (quartz); and 0.21 to 4.5 microns for Silica ($SiO_2$) glass (fused silica). Thus, light passing through the front glass of a light source has a wavelength of at most 5 microns so that the intensity of light with wavelengths larger than 5 microns is almost zero.

SUMMARY OF THE INVENTION

It is an object of the present invention to provide an obstacle detector which is not adversely affected substantially by interference such as solar light, the headlights of other vehicles or streetlamps.

The obstacle detector, for use in an automotive vehicle, according to the present invention includes means for transmitting a light signal against any obstacle likely to be present, or any other vehicle likely to travel or be parked, on the road on which the vehicle runs. The light signal is of such a wavelength that solar light energy having the same wavelength is not present, or is of very low intensity, at the surface of the earth and that the light energy from other sources such as the headlamps of other vehicles and/or streetlamps having the same wavelength when passed through the front glass of the light sources is not present or is of very low intensity. The wavelength of the light signal transmitted is preferably 6.5±1 microns. The light signal transmitted from the transmission means has sufficient intensity to travel to the obstacle or the other vehicle within a specified range and be reflected back to a light receiving means of the detector with sufficient intensity to trigger the receiving means. The receiving means includes a filter allowing signals having substantially the same wavelength as the transmitted light signal to pass therethrough to obtain information concerning the obstacle or other vehicle.

BRIEF DESCRIPTION OF THE DRAWINGS

Other objects, features, and advantages of the present invention will be apparent from the following description of a preferred embodiment of the present invention, taken in conjunction with the accompanying drawings, in which.

DETAILED DESCRIPTION OF THE PREFERRED EMBODIMENT

Figure 1:
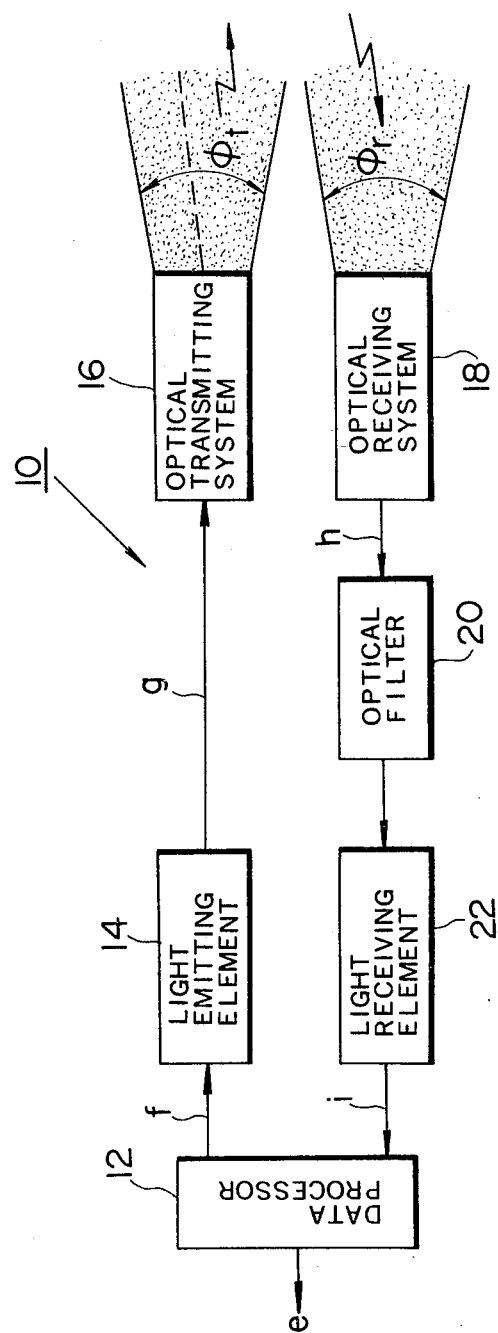
FIG. 1 is a block diagram of a preferred embodiment of an obstacle detector according to the present invention.

Referring to FIG. 1, there is shown a block diagram of a preferred embodiment of an obstacle detector according to the present invention, adapted to be mounted at the front and/or rear of an automotive vehicle, generally designated by reference numeral 10. The detector includes a data processor 12 which outputs a modulated electrical signal f, a light emitting element 14 which outputs an optical signal g corresponding to the signal f. The light emitting element is composed of a semiconductor infrared laser, the semiconductor being in the form of a cyrstal which has the formula $P_{b1-x}S_{nx}T_e$ where $P_b$ is lead, $S_n$ is tin, $T_e$ is tellurium and x is on the order of 0.07. The wavelength of the light radiated from the light emitting element 14 is between 6.4 to 8.3 microns. The detector 10 further includes an optical transmission system 16 which radiates the light g from the emitting element 14 forwards against a possible obstacle, or other vehicle moving or parked, not shown, present on the road on which the vehicle with the detector runs. The light signal transmitted from the transmission system 16 has sufficient intensity, for example 100 milliwatts, travel to the obstacle or other vehicle within a specified range, for example 150 meters, and to be reflected back to an optical receiving system 18 with sufficient intensity to trigger the receiving system. The specified range is about 150 meters in this particular embodiment. The receiving system includes a light receiving face plate, not shown, having a thickness of 2 millimeters, composed of arsenic oxide ($As_2O_3$) glass, selenium glass, or antimonate ($S_{b2}O_3$) glass which passes light of a wavelength between 2 to 21 micrometers therethrough. The detector also includes an optical filter 20 which receives the light h from the receiving system 18 to remove background light such as solar light, headlights, or streetlights, the filter having a relatively narrow band pass whose central wavelength is 6.5 microns. This filter includes a Fabbry-Perot interference filter. The detector further includes a photodetector 22, composed of a photodiode ($P_bS_nT_e$) where $P_b$ is lead, $S_n$ is tin and $T_e$ is tellurium and, which has a relatively good spectral sensitivity to light of a wavelength in the range of from 2 to 12 microns and which converts the light output from the filter into a corresponding electrical signal i. The data processor 12 receives the electrical signal i from the filter 22 and processes it in order to determine the distance from the vehicle, on which the obstacle detector is mounted, to the obstacle or other vehicle, the azimuth of the obstacle or other vehicle, and the relative speed of the vehicle to the obstacle or other vehicle to output an alarm signal e, if necessary. The transmitting system 16 can either transmit a pencil beam 16a of an angle smaller than 0.1 degrees which scans through an angle $\phi_t$ of about 4 degrees, or can transmit a light beam of an angle $\phi_t$ of about 4 degrees to detect obstacles. The receiving system 18 has a light receiving angle $\phi_r$ of about 4 degrees.

Figure 2:
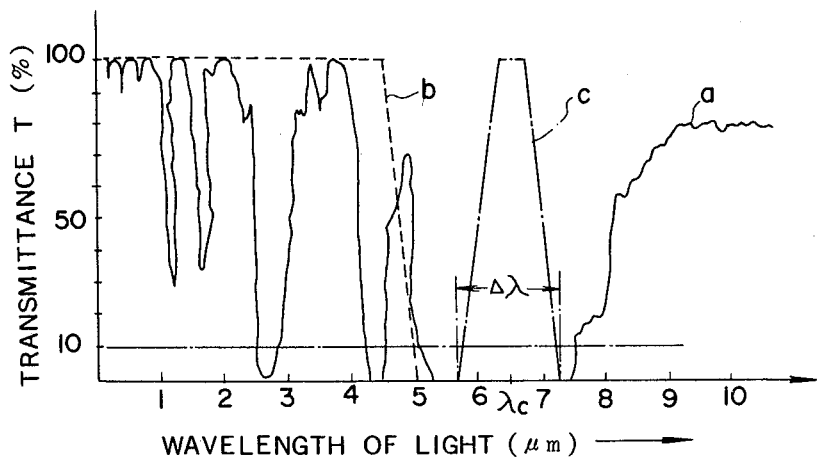
FIG. 2 is a graph showing the relationship between the wavelength of light with its transmittance through the atmosphere, the front glass of a light source and the filter used in the obstacle detector according to the present invention.

As will be clear from FIG. 2 which shows the transmittance characteristics of the atmosphere, the transmittance characteristics of the front glass of a light source such as the headlights of vehicles on streetlamps, and the transmittance characteristics of the filter 20, which are designated by the reference characters a, b and c, respectively, the transmittance of light through the atmosphere and the glass is greatly attenuated in the vicinity of the central wavelength $\lambda_c$ of 6.5 microns of the pass band of the filter 20.

Figure 3:
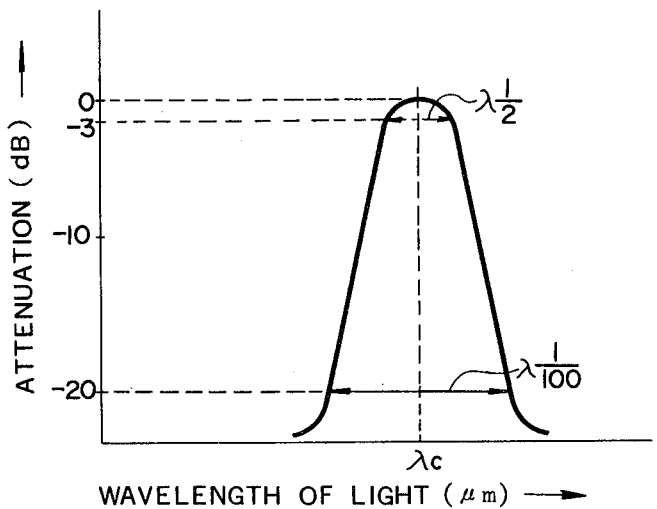
FIG. 3 is a graph showing the light transmittance characteristics of the filter used in the obstacle detector according to the present invention.

In FIG. 3, there is shown the attenuation characteristics of light passed through the filter 20 where the central wavelength $\lambda_c$ is 6.5 microns, the $-3$ dB band width $\lambda_{\frac{1}{2}}$ is 0.1 microns, and the $-20$ dB band width $\lambda_{1/100}$ is not larger than 0.5 microns. Thus, according to the present invention, interference from solar light, headlights, or streetlamps, etc., on the detection of an obstacle is minimized.

Since the wavelength of the light emitted from the light emitting element 14 is set at 6.5 microns, the density of solar light energy is at a minimum at that wavelength and the wavelength of 6.5 microns is outside the range of the light passed through the glass of the headlights of vehicles and streetlamps, so that the signal i has a relatively high signal to noise ratio S/N, thereby avoiding erroneous detection. Light having this wavelength has a very low transmittance through the atmosphere so that its transmittance is very low compared with light of other wavelengths. Thus, the signal transmitted from the transmission system 16 does not reach beyond the required range, for example 300 meters, thereby reducing interference with other systems.

The wavelength of light passing through the glass composing the front face of the receiving system 18 has been described as from 1 to 21 microns when the glass has a thickness of 2 millimeters, but a combination of such glasses serves to narrow the range of wavelengths which are capable of passing through the combination of glasses. Thus the receiving system 18 receives only the light designated for detection of an obstacle.

While the present invention has been described and shown with reference to a preferred embodiment thereof, the present invention is not limited to that embodiment. Various changes and modifications of the present invention could be made by those skilled in the art without departing from the scope and spirit of the present invention.

What is claimed is:

1. An obstacle detector for use in an automotive vehicle, comprising:
    (a) an optical transmitting system for transmitting a light signal against an obstacle likely to be present on the road on which the vehicle with the detector travels, the light signal having a wavelength differing from that of solar radiation present in large quantities at the surface of the earth and longer than that of light radiation transmitted by front glasses of headlights of other vehicles and/or streetlamps, the transmitting system including a light emitting element made of a semiconductor infrared laser, the semiconductor being in the form of a crystal which has the formula $P_{b(1-x)}S_{n(x)}T_{(e)}$ where $P_b$ is lead, $S_n$ is tin, $T_e$ is tellurium, and x is on the order of 0.07; and
    (b) an optical receiving system including an optical filter means having a pass band corresponding to the transmitted wavelength for blocking passage of solar radiation present in large quantities at the surface of the earth and for blocking light radiation passed by the front glasses of other sources;
    whereby optical signals received by the receiving signal are substantially free of background radiation including solar radiation and radiation generated by artificial sources.

2. The detector of claim 1, wherein the receiving system includes an arsenic oxide ($As_2O_3$) glass face for receiving therethrough the light signal reflected by said obstacle.

3. The detector of claim 1, wherein the receiving system includes a selenium glass face for receiving therethrough the light signal reflected by said obstacle.

4. The detector of claim 1, wherein the receiving system includes an antimonate ($S_{b2}O_3$) glass face for receiving system therethrough the light signal reflected by said obstacle.

5. The detector of claim 4, wherein the said pass band of said optical filter means has a central wavelength of 6.5 microns.

6. The detector of claim 5, wherein the filter means is of the Fabry-Perot interference type.

7. The detector of claim 5, wherein the receiving system includes a photodiode for converting the light coponent from the optical filter means to the corresponding electrical signal, the photodiode having the formula $P_bS_nT_e$ where $P_b$ is lead, $S_n$ is tin and $T_e$ is tellurium and having a relatively good spectral sensitivity to optical wavelengths in the range of from 2 to 12 microns.

8. In an obstacle detector for automotive vehicles having a radiation transmitting means, a radiation receiving means and a data processing means, the improvement comprising:
    means for reducing ambient and background noise in signals provided to said data processing means comprising:
    first wavelength selecting means in said transmitting means for providing output signals at predetermined wavelengths,
    said first wavelength selecting means being operable for selecting said predetermined wavelengths to be coincident with wavelengths of solar radiation blocked by natural filtration, and being further operable for simultaneously selecting said predetermined wavelengths to be coincident with wavelengths blocked by filtering means associated with articially generated radiation,
    a light emitting element in said radiation transmitting means made of a semiconductor infrared laser, the semiconductor being in the form of a crystal which has the formula $P_{b(1-x)}S_{n(x)}T_e$ where $P_b$ is lead, $S_n$ is tin, $T_e$ is tellurium, and x is on the order of 0.07, and second wavelength selecting means in said receiving means operable for selecting radiation signals at said predetermined wavelengths to pass therethrough for data processing, whereby signals passed by said second wavelength selecting means for processing are substantially reduced in ambient and background radiation content.

9. An improved obstacle detector as recited in claim 8 wherein at least said second wavelength selecting means is operable for blocking passage of radiation at wavelengths coincident with wavelengths passed by natural filtration or by filtering means associated with the artificially generated radiation.

10. An improved obstacle detector as recited in claim 9 wherein at least said second wavelength selecting means comprises filter means having a pass band between first and second wavelengths, said first wavelength corresponding to a wavelength passed by natural filtration and said second wavelength corresponding to a wavelength passed by filtering means associated with the artifically generated radiation.

11. An improved obstacle detector as recited in claim 10 wherein said filter means pass band passes wavelengths shorter than said first wavelength and longer than said second wavelength.

* * * * *